C. A. SANDSTROM.
AUTOMOBILE TRANSMISSION GEARING.
APPLICATION FILED FEB. 7, 1914.
1,124,533.
Patented Jan. 12, 1915.
2 SHEETS—SHEET 2.
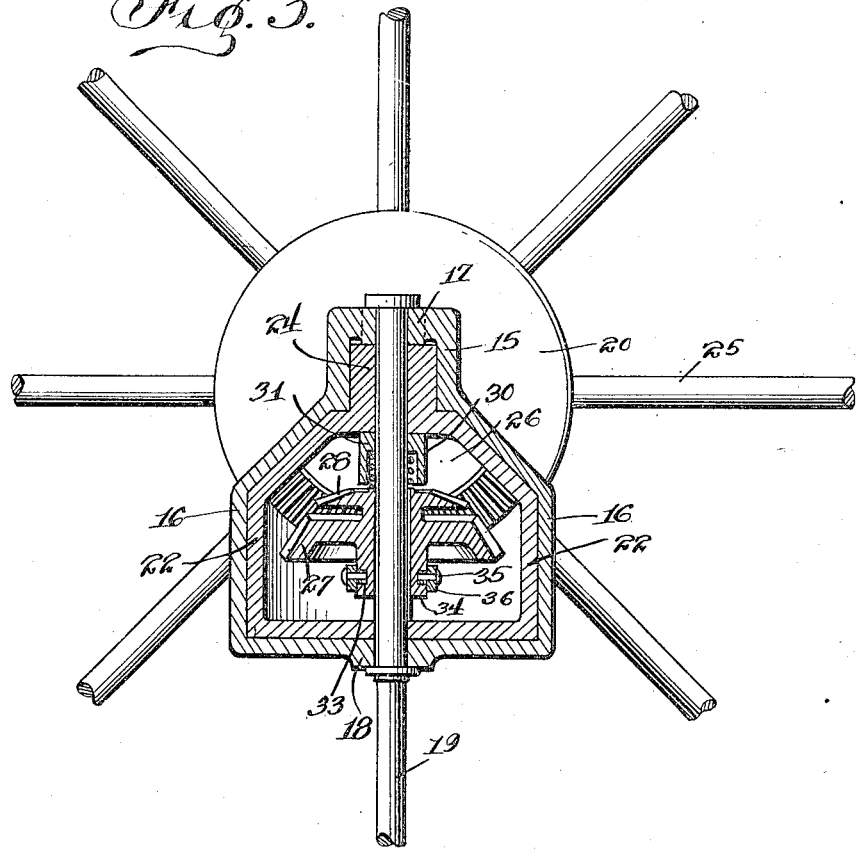
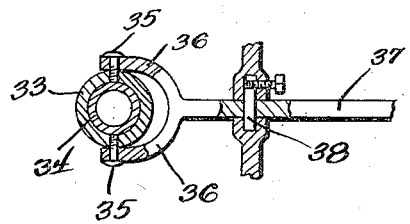

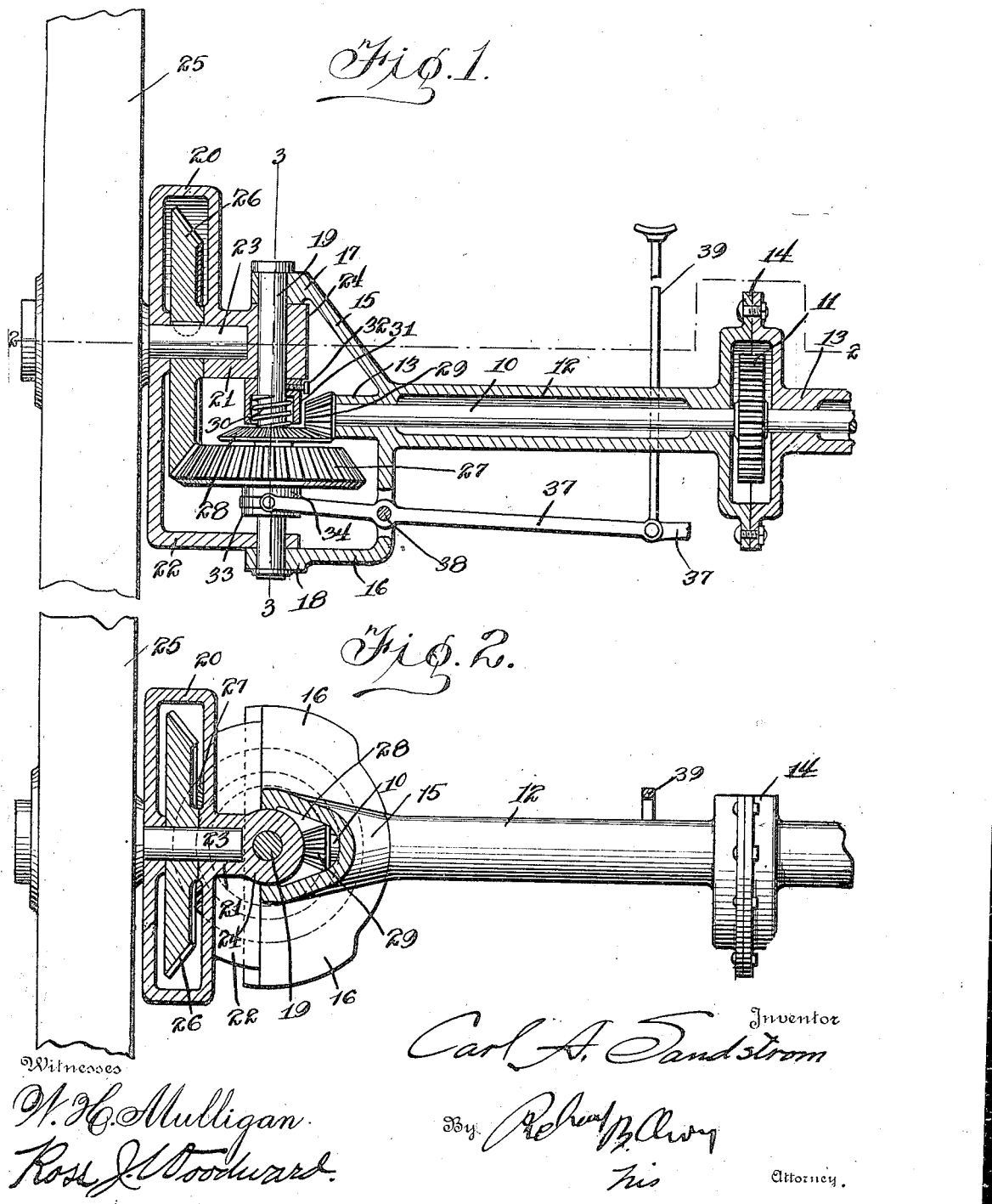

UNITED STATES PATENT OFFICE.

CARL ANTON SANDSTROM, OF WILLISTON, NORTH DAKOTA.

AUTOMOBILE TRANSMISSION-GEARING.

1,124,533.  Specification of Letters Patent.  Patented Jan. 12, 1915.

Application filed February 7, 1914. Serial No. 817,264.

*To all whom it may concern:*

Be it known that I, CARL ANTON SANDSTROM, a citizen of the United States, residing at Williston, in the county of Williams and State of North Dakota, have invented certain new and useful Improvements in Automobile Transmission-Gearing, of which the following is a specification.

This invention relates to an improved automobile transmission gearing, and the principal object of the invention is to provide a transmission gearing with an improved type of slidably mounted gear through which rotary motion may be transmitted from an axle to the wheel and which is slidably mounted so that the machine may be brought to a standstill.

Another object of the invention is to so construct this transmission gearing that it may be used in connection with an automobile so that the automobile may be propelled by the front wheels instead of the rear wheels or front and rear wheels at the same time to give a double driving contact with the ground.

Another object of the invention is to so mount the sliding gear that it will be normally held out of operative position and to provide improved means for moving the sliding gear into an operative position.

Another object of the invention is to provide an improved housing which incloses the gear wheels and shafts of the transmission.

This invention is illustrated in the accompanying drawings wherein—

Figure 1 is a view showing the transmission in longitudinal section; Fig. 2 is a view taken along the line 2—2 of Fig. 1; Fig. 3 is a section taken along the line 3—3 of Fig. 1; Fig. 4 is a fragmentary view showing the manner of mounting a lever forming part of this invention.

The driven shaft 10 is provided intermediate its length with a gear or sprocket wheel 11 by means of which rotary motion may be transmitted to the shaft 10. This shaft 10 is rotatably mounted in a tube 12 and passes through the bearings 13 formed in the tube. This tube is provided intermediate its length with an enlarged housing 14, which housing incloses the gear 11 for the major part of the circumference of the gear, one side being left open to permit access to the gear so that the gear may be rotated by any suitable means.

A housing 15 is provided at each end of the tubing 12 and is provided with side wings 16 and carries upper and lower bearings 17 and 18. A vertical shaft 19 is mounted in the bearings 17 and 18 and pivotally supports a companion housing 20 which is provided with a neck 21 and side wings 22. This neck 21 forms a bearing for the stub shaft 23 and is provided with a head or sleeve 24 through which the shaft 19 passes. The shaft 23 has the wheel 25 mounted thereon to turn with the shaft and carries a rigidly-mounted bevel gear 26 by means of which rotary motion may be transmitted to the shaft 23.

A beveled gear 27 is rotatably and slidably mounted upon the shaft 19 and is provided with a head 28 which forms a smaller bevel gear intended to mesh with the bevel gear 29 carried by the shaft 10. A spring 30 is mounted upon the shaft 19 in the housing and engages the head 28 of gear 27 to normally hold the head and gear out of engagement with the bevel gears 26 and 29. The housing 31 is rigidly secured to the shaft 19 beneath the head or bearing 24 by means of the set screw 32 so that when the spring 30 expands to move the gear 27 downwardly, the housing will remain in an elevated position. A collar 33 is mounted in a groove formed in the neck 34 of the gear 27 and carries screws 35 which pass through the forks 36 of the lever 37, which lever is pivotally mounted upon the pin 38 carried by the housing 15. This lever 37 has its outer end connected with a plunger 39 by means of which the lever may be rocked to move the bevel gear to the operative position shown in Fig. 1. Only one end of the shaft 10 has been shown in the drawing, but it is, of course, understood that both ends of the shaft will be connected with the wheels in the same manner shown.

In the operation of this device the shaft 10 is rotated from the engine of the automobile by any suitable means. When the plunger 39 is moved downwardly, the two levers 37 will be rocked to bring the heads 28 into engagement with the gears 29. At the same time the gears 28 will engage the gears 26 and rotary motion will be transmitted to the front driving wheels 25. Any suitable guiding mechanism can be connected with the housing 20 for rotating the outer housings and, thus guide the automobile. The wings 22 are rotatably mounted in the wings 16 of the inner housings so that the gears mounted in the housings will be protected from dust. The plunger 39 is held in the lowered position while the automobile is in motion by any suitable means such as a rack and it will thus be seen that it will not be necessary for the driver to keep his foot upon the plunger while the automobile is in motion. When the plunger 39 is released, the springs 30 will move the gears 27 and 28 downwardly and will thus interrupt the transmission of rotary motion from shaft 10 to the stub shaft 23 and cause the automobile to come to a standstill. By having the automobile driven from the front wheels instead of the rear wheels the body portion of the automobile may be pitched at an incline toward the rear end without interfering with the transmission. With automobiles in which the rear axle is the driving axle the body portion of the automobile must be raised a certain extent above the rear axle so that the body portion of the machine will not interfere with the transmission. This objection is overcome by the construction which I have provided. It should also be noted that by the improved construction I have provided a transmission which will be very strong and durable and which will not very easily get out of order since it consists of a relatively few number of parts strongly made and compactly put together.

What is claimed is:

1. A transmission comprising a casing, a housing at the outer end of said casing, a pivot shaft extending through said housing, said housing being provided with side wings, an auxiliary housing extending into said first-mentioned housing and provided with a bearing rotatably mounted upon said pivot shaft and provided with side wings extending into the side wings of said first-mentioned housing to form a dust-proof closure, a wheel-supporting shaft extending into said auxiliary housing with the inner ends rotatably mounted in the bearing of said auxiliary housing, a gear rigidly mounted upon said wheel-supporting shaft within said auxiliary housing, a collar rigidly mounted upon said pivot shaft beneath the bearing of said auxiliary housing, a bevel gear slidably mounted upon said pivot shaft, a head forming a second bevel gear carried by said first-mentioned gear, a spring mounted upon said pivot shaft within said collar and engaging the head of said bevel gear for normally holding said bevel gear in a normal position, a driven shaft rotatably mounted in said casing and extending into said first-mentioned housing, a bevel gear carried by said driven shaft within said first-mentioned housing, and means for raising said sliding gear to bring said sliding gear into engagement with the gear mounted upon said wheel-supporting shaft and to bring the gear formed upon the head of said sliding gear into engagement with the bevel gear of said driven shaft.

2. A transmission comprising a casing provided at its outer end with a main housing section, an auxiliary housing section, a pivot shaft pivotally connecting said housing sections, a shaft rotatably supported by said auxiliary housing section, a gear rigidly mounted upon said shaft, a driven shaft rotatably mounted in said casing and extending into said main housing section, a gear carried by said driven shaft, a gear slidably mounted upon said pivot shaft for meshing with said first-mentioned gear and provided with a head forming a gear plate meshing with the gear of said driven shaft, a neck extending from said sliding gear, a collar carried by said neck, a lever pivotally carried by said main housing section and having its inner end portion connected with said collar, means for rocking said lever to bring said sliding gear to a raised position for engaging said first-mentioned gear and bringing the gear of said head into engagement with the gear of said driven shaft, and means for normally holding said sliding gear in an inoperative position.

3. A transmission comprising a casing provided at its outer end with a main housing section, an auxiliary housing section provided with a bearing extending into said main housing section and with side wings extending into the main housing section, a pivot shaft carried by said main housing section and passing through the bearing of said auxiliary section to rotatably mount the same, a wheel supporting shaft rotatably carried by said auxiliary housing section and having its inner end portion journaled in the bearing thereof, a driven shaft rotatably mounted in said casing, means carried by said driven shaft for transmitting rotary motion from the same, means carried by said wheel supporting shaft for transmitting rotary motion to the same, means slidably mounted upon said pivot shaft for transmitting rotary motion from the motion transmitting means of said driven shaft to the motion transmitting means of said wheel supporting shaft, and means for moving the transmitting means longitudinally upon said pivot shaft into and out of engagement with the transmitting means of said driven and wheel supporting shafts.

In testimony whereof I affix my signature in presence of two witnesses.

CARL ANTON SANDSTROM.

Witnesses:
   THOMAS M. COONEY,
   E. E. BORGAN.